United States Patent Office 2,883,018
Patented Apr. 21, 1959

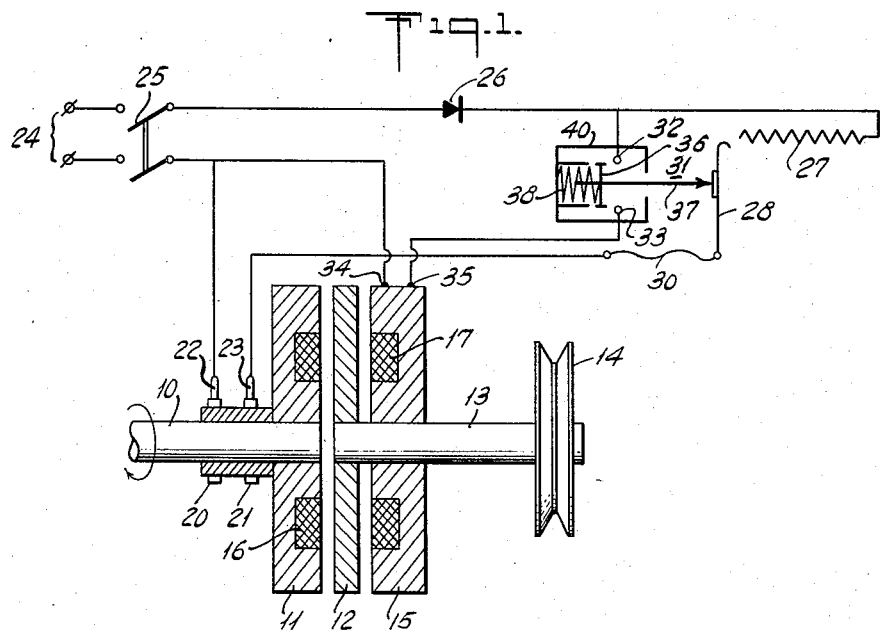
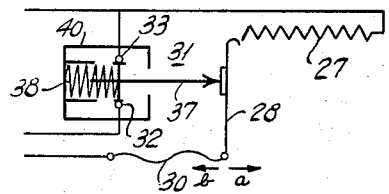
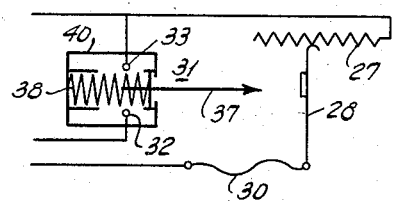
INVENTOR
KARL WINZ
BY
ATTORNEY

2,883,018

ELECTROMAGNETIC CLUTCH FOR SEWING MACHINES AND THE LIKE

Karl Winz, Kaiserslautern, Pfalz, Germany, assignor to G. M. Pfaff A.G., Kaiserslautern, Pfalz, Germany, a corporation of Germany Application April 4, 1956, Serial No. 576,011

Claims priority, application Germany April 13, 1955

4 Claims. (Cl. 192—12)

The present invention relates to electromagnetic clutches for starting and stopping sewing and the like machines driven by a continuously running motor or prime mover, more particularly to a control system for clutches of the type comprising a first or driven magnetic member provided with an electric exciting (starting) winding and secured to the input or driving shaft of the sewing or the like machine, a second or driven member or armature connected to the ouput or driven shaft and movable relative to said first member for effecting coupling engagement therewith upon energization of said starting winding, and a third stationary magnetic braking member also provided with an electric exciting (braking) winding and arranged to cooperate with said driven member upon disconnection of said starting winding, to instantly and securely stop the output shaft or machine driven thereby.

In the conventional embodiment of magnetic clutches of this type for the operation of sewing and the like machines, the clutch members are constructed in disc form and of a suitable magnetic material, the driven disc being arranged intermediate and coaxial with the driving and braking discs and a starting switch and/or variable rheostat being provided for connecting the starting winding to establish coupling connection between the driving and driven discs, while at the same time disconnecting the braking winding, and vice versa, upon declutching the driven shaft from the driving shaft, respectively, in a manner further described hereafter.

In using magnetic clutches of the above type for the starting and stopping of sewing machines, especially where it is required to adjust the needle to a desired position preparatory to the starting of the machine or where the hand wheel of the machine must be turned for carrying out other preliminary operations or adjustments preparatory to the starting of a sewing operation, it is necessary to temporarily release or disable the electromagnetic brake by disconnecting the braking winding. This may be effected in known arrangements having a starting lever or the like control organ which normally closes the braking winding and upon starting disconnects the braking winding while closing the starting winding, by exerting only a slight pressure upon or effecting a slight initial movement of the starting lever sufficient to disconnect the braking winding but insufficient to connect the starting winding. In other words, this method of disabling the magnetic brake with the machine in the normal or rest position is predicated on the existence of a certain play or lost motion of the starting lever encompassing the two postions of connecting the starting and braking windings, respectively.

In practice, the starting lever or the like for connecting the starting winding also serves to operate the adjustable contact of a rheostat inserted in series with the starting winding and the electric operating source to effect a gradual increase of the magnetic field of the clutch from zero to its final value, to insure a smooth pick-up of the driven disc by the driving disc or clutch member. The stroke or operating path of the starting lever is limited for reasons of design and in the interest of small mounting space, thus making it necessary to restrict the lost motion of the starting lever to an absolute minimum. As a result, the release of the brake and holding it in a position without engaging the clutch and starting the machine during the adjusting operation requires a certain skill and the close attention on the part of the operator in order to avoid accidental starting of the machine during the preparatory adjustments. This, in turn, may result in loss of control of the work, not to mention the delay and possible spoilage involved.

In order to avoid the above difficulties it has already been proposed to provide a separate independent switch for temporarily disconnecting the braking winding while carrying out the preparatory adjustments. This requires a special operation and, among other drawbacks, involves delays and renders this solution unsuitable for machines designed for rapid successive operating cycles.

Accordingly, an important general object of the present invention is the provision of a magnetic clutch control system for sewing and the like machines by which the above and related difficulties and drawbacks are substantially overcome.

Another object of the invention is to provide a magnetic clutch control system which will enable a disabling of the magnetic brake securely and reliably in both the engaged and disengaged positions of the clutch.

A more specific object of the invention is the provision of a control system of this type by which the clutch winding may be temporarily disconnected without detracting the operator's attention from the adjustments to be made preparatory to the starting of the sewing or the like machine.

Another object is to provide a clutch control system of the above type comprising auxiliary switch means for opening and closing the magnetic braking winding in response to the operation or movement of the starting switch, whereby to enable a temporary disabling of the braking winding by the starting switch in the rest or disengaged position of the clutch.

The foregoing and ancillary objects, as well as novel aspects and features of the invention, will be better understood from the following detailed description of a preferred embodiment taken in reference to the accompanying drawing, forming part of this specification and wherein:

Fig. 1 is a schematic diagram and control circuit of an electromagnetic clutch system constructed in accordance with the principles of the invention, the circuit shown corresponding to the disengaged position of the clutch and disabling of the braking winding;

Fig. 2 is a partial diagram showing the control circuit of Fig. 1 prior to starting of the machine and with the braking winding in its energized condition; and Fig. 3 is a further partial diagram similar to Fig. 2 and showing the control circuit during the operation or engaged position of the clutch and disabling of the braking winding.

Like reference characters identify like parts in the different figures of the drawing.

With the above objects in view, the invention involves essentially the provision of auxiliary switch means in the circuit of the braking winding of an electromagnetic clutch of the general type described above and coupled with or controlled in response to the operation of the main control or starting switch in the circuit of the starting winding of the clutch, whereby the auxiliary switch means effects an automatic disconnection of the braking winding in the engaged or operative position of the clutch and may be further controlled by operation of the main starting switch to disconnect the braking winding in the normal or disengaged clutch position.

In a preferred embodiment as shown by the drawing, this consists of a pair of fixed contacts inserted in series with the braking winding and cooperating with a bridging or wiping contact operable to a position on either side of said fixed contacts in response to the control of the starting switch, said fixed contacts being normally closed by said bridging contact in the normal or non-operative position of the clutch to energize the braking winding. If the machine is started by operating the starting switch in one direction from the normal or rest position, such as by depressing or rotating a foot treadle in anti-clockwise direction, the bridging contact is moved to one side of the fixed contacts, whereby to de-energize the braking winding and to allow starting and operation of the sewing machine. Conversely, by subsequently operating the starting switch in the opposite direction, such as by releasing the foot treadle or rotating it in clockwise direction, the machine will be stopped and the braking winding again energized by the closing of the fixed contacts upon reaching the normal or rest position. If it is now desired to disconnect the braking winding without restarting the machine for the purpose of adjusting the needle or effecting other preparatory adjusting operations, the starting switch is merely further operated in the closing direction, that is, the treadle is rotated further in clockwise direction beyond the normal or starting position. This additional movement is preferably controlled or counteracted by a spring offering an increased resistance to the operation. Upon release, the starting switch returns to its normal or starting position, causing renewed energization of the braking winding. The machine may then be started and operated in the usual manner.

Referring to the drawings, the numeral 10 indicates the input or driving shaft driven by a continuously running prime mover, such as an electric motor (not shown), and having secured to it a driving clutch member in the form of a disc 11 of magnetic material arranged to cooperate with a driven disc or armature 12 concentric with and axially movable relative to the disc 11 and secured to the output or driven shaft 13. The latter may serve to drive a sewing machine by means of a leather belt and V-shaped pulley 14 or through any other suitable drive or coupling means. There is further provided a stationary braking disc 15 of magnetic material coaxial with and mounted on the side of the driven disc 12 opposite from the driving disc 11. The driving and braking discs are provided with magnetic exciting windings 16 and 17, respectively, connected to a source of electric energy, such as an alternating current circuit or line indicated at 24.

More specifically, the ends of the starting winding 16 are connected to a pair of slip rings 20 and 21 insulatingly mounted upon the shaft 10 and cooperating with sliding contacts or brushes 22 and 23, respectively. The brush 22 is connected to one pole of the operating source 24 through a master control switch 25, the opposite pole of the source 24 being connected by way of the switch 25, a rectifier 26, starting rheostat 27, adjustable contact member 28 and a flexible connection 30 to the brush 23. The starter resistance 27 connected in series with the starting winding serves in a known manner to effect a gradual increase of the starting current and in turn of the magnetic field, to cause a smooth pick-up of the driven disc 12 by the driving disc 11 upon engagement of the clutch.

The braking winding 17 is similarly connected to the source 24 by connecting its end or terminal 34 to one pole of the source by way of the switch 25, the opposite pole of the source being connected through said switch 25, the rectifier 26, a pair of contacts 32 and 33 of an auxiliary switch 31 to the other terminal 35 of the winding 17. The switch 31 further comprises a bridging or wiping contact member 36 operable to a position on either side of the contacts 32 and 33, to open and disconnect the latter, and having an extension 37 forming an actuating element cooperating with or engaged by the contact member 28 of the starting rheostat 27 connected in the circuit of the starting winding 16. The contact 36 is normally urged in a direction towards the contact member 28 by the action of a compression spring 38 or the like, its movement beyond contacts 32 and 33 being limited by the switch housing 40 acting as a stop as shown in Fig. 3.

In a system as described above in the normal or starting position as shown in Fig. 2, the circuit of the starting winding 16 is opened by the contact member 28 disengaging the starting rheostat 27. In this position, the wiping contact 36 of the auxiliary switch 31 bridges the contacts 32 and 33 by the action of the spring 38 and actuating member 37 engaging the switch member 28 acting as a stop therefore. If the machine is started by operating the switch member 28 in the direction of the arrow $a$ to close the starting circuit and to gradually increase the exciting current of the winding 16, the braking winding will be interrupted by the wiping member 36 being displaced towards the right by the action of the spring 38 to a position limited by the housing 40, as shown in Fig. 3. If it is desired to stop the machine by operating the switch member 28 in the reverse direction indicated by the arrow $b$, the starting circuit will again be interrupted and the braking circuit closed as shown by Fig. 2.

If it is now desired to disconnect the braking winding without restarting the machine, the switch member 28 is further operated in the closing direction, that is, in the direction of the arrow $b$, whereby to move the wiping contact 36 towards the left against the increased resistance of the spring 38, and to interrupt the braking circuit. In this position, adjustments may be carried out, without stopping the prime mover or interrupting the power supply, safely and without the danger of accidentally starting the machine.

In carrying the invention into practice, the switch member 28 may be advantageously controlled by means of a foot treadle, in such a manner that downward movement or rotation of the treadle from its starting position, Fig. 2, causes the starting of the machine, while upward movement or rotation in the opposite direction from the starting position causes interruption of the braking winding, in the manner readily understood from the foregoing.

While a D.C. operated clutch has been shown in the drawing for illustration, it is understood that the invention applies equally to A.C. clutches, these and other details or equivalents being omitted from the disclosure as unnecessary for the understanding of the invention.

In the foregoing the invention has been described with reference to a specific illustrative device. It will be evident, however, that variations and modifications, as well as the substitution of equivalent parts and elements for those shown herein may be made without departing from the broader spirit and scope of the invention as set forth in the appended claims. The specification and drawing are accordingly to be regarded in an illustrative rather than in a restrictive sense.

I claim:

1. The combination with an electromagnetic clutch for sewing and the like machines of the type having a driving member, a magnetic starting winding for said member, a starting circuit therefor, a driven member arranged for engagement with and disengagement from said driving member upon energization and deenergization, respectively, of said starting winding, a braking member having a magnetic braking winding, and a braking circuit therefor; of a control system comprising a starting switch having a movable contact operable in either of a pair of different directions from an intermediate position, said contact closing said starting circuit by operation in one of said directions and opening said starting circuit upon return to said intermediate position, a braking switch having a pair of stationary contacts inserted in said braking circuit and a movable contact operable from an intermediate position bridging said stationary contacts, to close said braking circuit, in either of a pair of different directions, to open said braking circuit, and resilient means yieldingly urging said second movable contact into engagement with said first movable contact, whereby to close said braking circuit in the intermediate position of said first movable contact and to open said braking circuit by operation of said first movable contact in either said directions by and against the action of said resilient means, respectively.

2. An electromagnetic clutch as claimed in claim 1, including a variable resistance in said starting circuit controlled by said first movable contact, and stop means to limit the movement of said second movable contact in the direction towards said first movable contact by said resilient means.

3. The combination with an electromagnetic clutch for sewing and the like machines of the type having a driving member, a magnetic starting winding for said member, a starting circuit therefor, a driven member arranged for engagement with and disengagement from said driving member upon energization and deenergization, respectively of said starting winding, a braking member having a magnetic braking winding, and a braking circuit therefor; of a control system comprising a starting switch having a movable contact operable in opposite directions from an intermediate position, said contact closing said starting circuit by operation in one of said directions and opening said starting circuit upon return to said intermediate position, a braking switch having a pair of stationary contacts connected in said braking circuit and a movable contact operable from an intermediate position bridging said stationary contacts, to close and braking circuit, in opposite directions, to open said braking circuit, and resilient means yieldingly urging said second movable contact into engagement with said first movable contact, whereby to close said braking circuit in the intermediate position of said first movable contact and to open said braking circuit by operation of said first movable contact in either said directions by and against the action of said resilient means, respectively.

4. The combination with an electromagentic clutch for sewing and the like machines of the type having a driving member, a magnetic starting winding for said member, a starting circuit therefor, a driven member arranged for engagement with and disengagement from said driving member upon energization and deenergization, respectively, of said starting winding, a braking member having a magnetic braking winding and a braking circuit therefor; of a control system comprising a starting switch having a movable contact operable in either of a pair of different directions from an intermediate position, said contact closing said starting circuit by operation in one of said directions and opening said starting circuit upon return to said intermediate position, a braking switch having a movable contact operable from an intermediate position closing said braking circuit in either of a pair of different directions, to open said braking circuit, and resilient means yieldingly urging said second movable contact into engagement with said first movable contact, whereby to close said braking circuit in the intermediate position of said first movable contact and to open said braking circuit by operation of said first movable contact in either said directions by and against the action of said resilient means, respectively.

References Cited in the file of this patent

UNITED STATES PATENTS

| | | |
|---|---|---|
| 2,546,393 | Hale | Mar. 27, 1951 |
| 2,619,207 | Smith | Nov. 25, 1952 |
| 2,692,667 | Bliedung et al. | Oct. 26, 1954 |
| 2,708,415 | White | May 17, 1955 |
| 2,779,448 | Lambach et al. | Jan. 29, 1957 |